United States Patent
Devroe et al.

(10) Patent No.: US 11,882,794 B2
(45) Date of Patent: Jan. 30, 2024

(54) STUFFER ASSEMBLY FOR AN AGRICULTURAL BALER

(71) Applicant: CNH Industrial America LLC, New Holland, PA (US)

(72) Inventors: Jeroen Devroe, Izegem (BE); Dries Liefooghe, Alveringem (BE); Xavier G. J. M. Bonte, Zuidzande (NL); Danny N. O. Claeys, Oedelem (BE); Christiaan A. C. Lippens, Sint-Laureins (BE); Karel Naeyaert, Loppem (BE); Bram Rosseel, Snellegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/855,708

(22) Filed: Jun. 30, 2022

(65) Prior Publication Data

US 2023/0000020 A1 Jan. 5, 2023

(30) Foreign Application Priority Data

Jun. 30, 2021 (EP) .................................... 21183002

(51) Int. Cl.
*A01F 15/10* (2006.01)
*A01F 15/04* (2006.01)

(52) U.S. Cl.
CPC ............ *A01F 15/10* (2013.01); *A01F 15/042* (2013.01); *A01F 2015/102* (2013.01)

(58) Field of Classification Search
CPC ...... A01F 15/10; A01F 15/042; A01F 15/101; A01F 2015/102
See application file for complete search history.

(56) References Cited

U.S. PATENT DOCUMENTS

| | | | |
|---|---|---|---|
| 3,938,652 A | 2/1976 | Sacht et al. | |
| 4,135,444 A * | 1/1979 | White | A01F 15/101 100/189 |
| 6,199,357 B1 | 3/2001 | Bloom | |
| 7,047,719 B2 * | 5/2006 | Dubois | A01F 15/101 56/341 |
| 7,124,564 B2 | 10/2006 | Glazik et al. | |
| 8,683,779 B2 | 4/2014 | Duenwald et al. | |
| 10,188,038 B2 | 1/2019 | Shoup | |
| 2005/0235841 A1 | 10/2005 | Hel | |
| 2012/0179338 A1 | 7/2012 | Dresher | |
| 2019/0200525 A1 | 7/2019 | MacMillan et al. | |

FOREIGN PATENT DOCUMENTS

DE  2929598 A  2/1980

OTHER PUBLICATIONS

Extended European Search Report for EP Application No. 21183002.1 dated Dec. 10, 2021 (6 pages).

* cited by examiner

*Primary Examiner* — Jimmy T Nguyen
(74) *Attorney, Agent, or Firm* — Peter K. Zacharias

(57) ABSTRACT

A stuffer assembly includes a stuffer chute and a stuffer for transferring crop material from the stuffer chute into a baling chamber. The stuffer includes a tine bar having a plurality of tines. Each tine is slidably connected to the tine bar to be linearly movable with respect to the tine bar between an extended position and a retracted position parallel to a radial direction of the tine bar. A method accordingly includes retracting a tine from the extended position into the retracted position in case of an overload.

17 Claims, 5 Drawing Sheets

STUFFER ASSEMBLY FOR AN AGRICULTURAL BALER

FIELD OF INVENTION

The present invention relates to a stuffer assembly for an agricultural baler, an agricultural baler comprising a stuffer assembly as well as a method for operating a stuffer assembly.

BACKGROUND OF THE INVENTION

In an agricultural baler, crop material previously cut and formed to windrows on a field is picked up from the ground by a pick-up unit of the baler and fed into a stuffer chute, where it is collected and usually pre-compressed to form a charge of crop material. A completed charge of crop material is then transferred to a baling chamber of the baler by means of a stuffer having a plurality of tines, which engage the charge of crop material and push same from the stuffer chute into the baling chamber. In the baling chamber, a reciprocating plunger is provided to compress multiple charges of crop material to form a bale.

A stuffer assembly comprising the stuffer chute and the stuffer is configured to quickly load charges of crop material into the baling chamber within a short time interval during which the plunger clears an entrance of the baling chamber. Typically, the plurality of tines is provided on a stuffer tine bar extending parallel to a width of the stuffer chute and driven to move the plurality of tines along a stuffer trajectory. The stuffer trajectory comprises a movement of the plurality of tines to insert same into the stuffer chute and a movement of the plurality of tines along the stuffer chute to transfer the charge of crop material into the baling chamber.

At times, an obstacle, such as a stone or other foreign matter, may be comprised in the crop material picked up from the field and introduced into the stuffer chute. In this case, one or more tines may hit the obstacle or the obstacle may get caught between a tine and a wall of the stuffer chute resulting in an increased load acting on the respective tine. Eventually, the tine and tine bar may bend or even break if the load applied on the tine exceeds a certain threshold.

To protect a drive mechanism of the stuffer assembly from overload and damage, it is known to provide one or more shear bolts on the stuffer, which are configured to break when an overload occurs thereby reducing the impact on the drive mechanism. For example, a shear bolt may be provided on a connection between the tine bar and a stuffer arm. Failure of the shear bolt allows the tine bar to pivot with respect to the stuffer arm. However, the tines and the tine bar may still be damaged resulting in downtime of the baler and expensive repair and spare parts.

Alternative stuffer assemblies are known in which tines are rotatably mounted to pivot with respect to the tine bar or stuffer arm when a tine is subjected to an increased load. However, the respective tine is thereby placed in an inoperative condition and the stuffer does not fully engage with the charge of crop material to be transferred into the baling chamber. This may result in poor quality of the charge of crop material and, thus, of the bale to be formed. Also, the pivoted tine must often be manually returned into and secured in a working position.

SUMMARY OF THE INVENTION

Hence, it is an object to provide a stuffer assembly for an agricultural baler and a method for operating a stuffer assembly, which are capable of reducing the risk of damage to the stuffer assembly's components and at the same time provide for high quality bales and reduced downtime of a baler.

According to an aspect of the present invention, a stuffer assembly for an agricultural baler comprises a stuffer chute for collecting and pre-compressing a charge of crop material and a stuffer configured to transfer the charge of crop material collected within the stuffer chute into a baling chamber of the agricultural baler. The stuffer comprises a stuffer arm having a tine bar mounted to one end of the stuffer arm, wherein the tine bar comprises a plurality of tines. Each tine of the plurality of tines is slidably connected to the tine bar such that each tine of the plurality of tines is linearly movable with respect to the tine bar between an extended position and a retracted position in a direction parallel to a radial direction of the tine bar.

In this way, a tine interfering with an obstacle, such as a stone comprised in the charge of crop material, can be moved into the retracted position to avoid further interaction with the obstacle. Hence, a load acting on the tine and thus on the tine bar will not increase further due to said interference, thereby protecting the tine bar and a stuffer drive mechanism from damage caused by harmful overload. At the same time, retracting the tine about a certain distance into the retracted position only reduces the depth of insertion of the tine into the stuffer chute but generally allows the tine to remain in an operational position enabling further engagement with the charge of crop material to be transferred into the baling chamber. Thus, the tine further engages with the charge of crop material even upon retraction and as much crop material as possible is transferred into the baling chamber resulting in higher quality of the charge of crop material and therefore of the bale to be formed.

The radial direction of the tine bar is defined perpendicular to a longitudinal direction of the tine bar, which is the main direction of extension of the tine bar. The longitudinal direction of the tine bar preferably extends perpendicular to a direction of movement of the tine bar and the plurality of tines within the stuffer chute and parallel to a width of the stuffer chute. In other words, the longitudinal direction of the tine bar extends parallel to a drive shaft of the stuffer drive mechanism and perpendicular to a direction of travel of the baler across a field. Preferably, the tine bar is of a cylindrical or rod-like shape.

The plurality of tines is arranged next to each other in the longitudinal direction of the tine bar. The tines are thus distributed over the width of the stuffer chute. The plurality of tines further extend substantially in parallel to the radial direction of the tine bar, which corresponds to a depth of the stuffer chute. Under normal circumstances and with substantially evenly distributed crop material within the stuffer chute, a substantially uniform load is applied on the plurality of tines during their movement.

Preferably, each tine of the plurality of tines is individually connected to the tine bar. Only the tine affected by an increased load can then be retracted, whereas the remaining tines of the plurality of tines remain in the extended position and thus in a fully operational condition. Also, any damage potentially occurring in response to an overload can thereby be limited to the affected tine and/or its connection to the tine bar. However, at least two tines of the plurality of tines could also be connected to the tine bar as a unit.

Each tine of the plurality of tines is connected to the tine bar at a proximal end of the tine and comprises a tip on a distal end of the tine. Further, each tine comprises a crop engaging surface configured to contact and engage with a bottom side of a charge of crop material within the stuffer chute and to push said charge into the baling chamber.

Particularly critical loads on a tine may occur when the tip of the tine hits an obstacle during insertion of the tine into the stuffer chute or of when an obstacle gets caught between the tip of the tine and an adjacent stuffer chute wall. Thus, at least a portion of each of the plurality of tines comprising the tip is linearly movable with respect to the stuffer bar. The plurality of tines can each be formed as a single part but can also be formed by multiple parts, as will be explained further below.

In the extended position, the crop engaging surfaces of the plurality of tines are arranged on a first level with respect to the tine bar. The first level may be defined as a distance between the crop engaging surfaces and a longitudinal axis of the tine bar in a direction perpendicular to the crop engaging surfaces. That is, the first level is defined with respect to the tine bar and maintained during movement of the stuffer and the tine bar. A first plane may be defined by the crop engaging surfaces arranged in the extended position, if the crop engaging surfaces of the plurality of tines are substantially planar.

In a particularly preferred embodiment, a crop engaging surface of a tine of the plurality of tines, which is positioned in the retracted position, is also arranged on the first level and, if applicable, in the first plane. Consequently, the crop engaging surface of a tine moved into the retracted position remains in one level, i.e. the first level, with the crop engaging surfaces of the tines arranged in the extended position, thereby ensuring further engagement of the tine with the charge of crop material.

The tines are therefore not rotated with respect to the tine bar but an angular position of the tines with respect to the tine bar is maintained while moving from the extended position into the retracted position. In other words, a first angular position of each tine of the plurality of tines with respect to the tine bar is defined in the extended position and a second angular position of each tine of the plurality of tines with respect to the tine bar is defined in the retracted position, wherein the first angular position preferably corresponds to the second angular position.

It is appreciated that preferably each tine is connected to the tine bar such that it is exclusively linearly movable in one direction parallel to the radial direction of the tine bar and more preferably to the crop engaging surfaces. Rotation of the plurality of tines is prevented, preferably by mechanical stop or a guide means.

A plurality of brackets may be mounted on the tine bar, wherein at least one tine of the plurality of tines is slidably connected to each bracket of the plurality of brackets. Preferably, the at least one tine is connected to the corresponding bracket by a first connecting means but the movable connection could be realized in different ways as well. The first connecting means therefore movably connects the corresponding tine to the at least one bracket and thus to the tine bar such that the tine is movable between the extended position and the retracted position. In this way, a reliable but simple connection of each of the plurality of tines to the tine bar can be realized.

Preferably, the number of the plurality of brackets corresponds to the number of the plurality of tines. Thus, each tine of the plurality of tines is individually mounted on the tine bar by means of one bracket of the plurality of brackets.

The plurality of brackets can be detachably mounted on the tine bar, e.g. by means of a shaft-hub connection, such that it can be demounted from the tine bar in a non-destructive manner. Alternatively, the plurality of brackets can be fixedly attached to the tine bar, e.g. by welding, such that the brackets cannot be demounted from the tine bar in a non-destructive manner.

Generally, the plurality of tines is preferably detachably mounted on the tine bar, i.e. mounted to the tine bar by a detachable connection. The plurality of tines can thus be easily mounted on and demounted from the tine bar in a non-destructive manner. By detachably mounting the plurality of tines to the tine bar, the plurality of tines and/or their connection to the tine bar can also be configured to fail prior to any damage to the tine bar. The tine bar and stuffer drive mechanism are thereby reliably protected. In addition, single tines can be replaced upon damage caused by an overload, thereby eliminating the need to replace the entire tine bar. Single tines can in turn be sold as service parts enabling cheaper repair compared to replacement of the entire tine bar. If only the connection of a tine to the tine bar fails due to an increased load acting thereon but the tine itself remains undamaged, the tine may simply be reconnected to the tine bar. It may then be sufficient to only exchange connecting means of the tine, thereby resulting in even cheaper repair.

In this case, the plurality of tines is preferably detachably connected to the plurality of brackets. In this way it is guaranteed that a damaged tine can always be easily replaced.

In addition to the first connecting means, each tine of the plurality of tines may further be connected to the corresponding bracket by a second connecting means securing the tine in the extended position. The second connecting means may fixedly arrange or bias the tine in the extended position. By doing so, the plurality of tines is reliably held in the extended position until an increased load acting on a tine of the plurality of tines necessitates retraction of said tine into the retracted position. In a preferred embodiment, each tine of the plurality of tines is therefore movably connected to the tine bar by the first connecting means and secured in the extended position by the second connecting means.

The first connecting means may be configured to fail or deform at a predetermined first load. That is, the first connecting means is configured to withstand a load up to the first load and will fail or deform if the load applied to the first connecting means equals or exceeds the predetermined first load. Failure or deformation of the first connecting means may cause the tine to be separated from the tine bar entirely. The load applied to the first connecting means depends on the load acting on the corresponding tine during its movement along the stuffer trajectory. An increased load on the tine will thus result in an increased load acting on the first connecting means.

The second connecting means may be configured to fail or deform at a predetermined second load. That is, the second connecting means is configured to withstand a load up to the second load and will fail or deform if the load applied to the second connecting means equals or exceeds the predetermined second load. The load applied to the second connecting means also depends on the load acting on the corresponding tine during its movement along the stuffer trajectory. An increased load on the tine will thus result in an increased load acting on the second connecting means as well. If the second connecting means fails or deforms, it thereby releases the tine to be movable into the retracted position.

To withstand a certain load means that the first and second connecting means are configured to maintain their integrity and position as long as the load acting on the connecting means is less than the predetermined first and second load, respectively. In case of an overload, however, a connecting means may break, plastically deform or elastically deform. In the latter case, the connecting means may be adapted to return the tine into its extended position when the applied load decreases.

A two-stage safety system can be provided to reduce downtime of the baler and to potentially eliminate the need to replace or reconnect a tine upon interference with an obstacle in less critical cases. In order to do so, the first load is preferably greater than or equal to the second load. If the first load is at least slightly higher than the second load, it is ensured that a tine, to which an increased load is applied, is first moved into the retracted position before being completely separated from the tine bar. The tine will therefore not get lost but can be moved into the extended position again, either by the second connecting means biasing the tine into the extended position or by an operator replacing the second connecting means to secure the tine in the extended position.

The first load therefore defines a maximum load transferred to the tine bar and the stuffer drive mechanism during operation of the stuffer assembly. The second load in turn defines a maximum load available for transferring a charge of crop material into the baling chamber with the plurality of tines remaining fully operational.

In all embodiments, a particularly simple design of the stuffer can be achieved when the first connecting means comprises a bolt, preferably a shear bolt, slidably received in the bracket or the tine and/or when the second connecting means comprises a bolt, preferably a shear bolt, or a resilient member, such as a spring member. The second connecting means may also comprise both, a shear bolt and a resilient member at the same time. For example, the shear bolt may secure the tine in the extended position and, upon failure of the bolt, the tine will be moved against the bias of the resilient member into the retracted position. Alternatively, the shear bolt may secure the resilient member to the tine, wherein the tine will first be moved against the bias of the resilient member into the retracted position and the bolt will then fail upon further increase in the load applied.

Shear bolts are cheap as well as simple to use and replace. More importantly, shear bolts are designed to fail at a predetermined load and can therefore be precisely chosen in accordance with the desired values of the first and second loads, respectively. Hence, in an exemplary embodiment of the present invention, the first and the second connecting means are both formed by a shear bolt.

The first and second connecting means, especially when formed by shear bolts, may extend parallel to the longitudinal direction of the tine bar and thus substantially perpendicular to a longitudinal direction of the tine. Alternatively, the first and second connecting means may extend perpendicular to both, the longitudinal direction of the tine bar and the tine.

Each tine of the plurality of tines can comprise a tine support connecting the tine to the corresponding bracket and a tine body having the crop engaging surface. The tine support and tine body of one tine can be integrally formed or can be formed by separate parts. When formed by separate parts, the tine support and the tine body can be fixedly connected, e.g. welded, or releasably connected to each other. In any case, the tine support and the tine body preferably each have a plate-like shape. The tine support and the tine body can then be arranged substantially perpendicular to each other, such that the tine has a T-shaped cross-section. The tines are thus provided with high stability at low weight.

Different types of tine bodies can be provided to allow the plurality of tines to be adapted to a characteristic of the crop material. The characteristic of the crop material may comprise the type of crop material, such as hay, straw or silage, and/or a condition of the crop material, such as humidity, desired density or length of cut crop. Different types of tine bodies can comprise different sizes of tines, e.g. different widths and/or lengths of the tine bodies, different shapes of the tine bodies, e.g. straight or curved tine bodies, or different materials, which may result in a different resistance of the tines.

In a particularly preferred embodiment, each bracket of the plurality of brackets comprises a first mounting plate and a second mounting plate arranged next to each other in the longitudinal direction of the tine bar and extending from the tine bar in the radial direction thereof. Each tine of the plurality of tines is partially received between the first mounting plate and the second mounting plate of the corresponding bracket, i.e. of the bracket to which it is connected. The first and second mounting plates are connected to the tine bar.

In this way, each tine is properly supported by the first and second mounting plates and can be securely fastened thereto. For example, the tine support can be arranged between the first and second mounting plates and, if desired, be in firm contact to the mounting plates to laterally support the tine and to guide same as it is moved into the retracted position. The tine body, in particular a surface of the tine body opposite to the crop engaging surface, may rest on an upper surface of the first and second mounting plates to support the tine in a direction, in which a load is applied to the tine during transfer of the charge of crop material into the baling chamber. Preferably, each tine is properly supported by the first and second mounting plates in both of the extended and retracted positions. This allows the tine to be operational upon retraction into the retracted position and there is no need for an operator of the baler to intervene immediately.

The tine support can be fastened to the mounting plates by means of the first and second connecting means. The tine support, the first mounting plate and the second mounting plate may therefore each comprise at least one through hole, these through holes being aligned with each other to receive the first and/or second connecting means. Preferably, the tine support, the first mounting plate and the second mounting plate each comprise a through hole for each of the first and second connecting means.

To movably connect the tine to the bracket as mentioned above, at least one of the first and second mounting plates comprises guide means, the guide means being configured to slidably receive the first connecting means and/or to support a sliding portion of the tine. Preferably, the first and the second mounting plates comprise corresponding guide means to uniformly support the first connecting means and/or the tine.

The guide means may be formed by an elongated aperture or elongated through hole in the first mounting plate and/or the second mounting plate, the elongated aperture or trough hole being configured and dimensioned to slidably receive the first connecting means. That is, a width of the elongated aperture or trough hole preferably corresponds to a diameter of the first connecting means and a length of the elongated aperture or trough hole preferably corresponds at least to a distance about which the tine is movable between the extended position and the retracted position. Alternatively, the tine and in particular the tine support may comprise corresponding guide means slidably receiving the first connecting means.

The guide means may comprise a guide surface formed by a portion of the first and second mounting plates, which faces a corresponding surface of the tine. For example, the first and/or second mounting plates may comprise a rail or shoulder providing the guide surface.

Generally, the distance about which each of the plurality of tines is movable between the extended position and the retracted position is between 5 mm and 250 mm, more preferably between 10 mm and 120 mm, even more preferably between 20 mm and 60 mm. The distance is preferably selected to be large enough to bypass an obstacle contained in the charge of crop material but small enough to provide sufficient engagement with crop material also in the retracted position of the tine.

It is furthermore preferred that the stuffer assembly comprises a plurality of sensors configured to detect a position of each tine of the plurality of tines. The plurality of sensors may comprise one sensor for each tine of the plurality of tines. The plurality of sensors can be mounted on the tine bar, within the tine bar, or on the plurality of brackets.

The plurality of sensors may be configured to detect at least one of the extended and retracted positions of the corresponding tine or any position of the corresponding tine. Preferably, the plurality of sensors detects at least whether the corresponding tine is arranged in the retracted position, as in this event adaption of the operation of the baler or intervention of an operator may be required.

An output signal of the plurality of sensors indicating the position of the plurality of tines may be provided to an operator of the baler. For example, the output signal may be used to generate an alarm signal provided to the operator. The output signal may also be provided to a control unit of the baler and/or of a towing vehicle advancing the baler. The output signal may then be used to trigger an automatic driving system such that the baler or towing vehicle is automatically slowed down once a tine of the plurality of tines is moved into the retracted position. This will result in a smaller load being applied to the plurality of tines. Another function could be to stop the baler and/or the pick-up unit in response to the output signal. Among others, this could be useful if the output signal indicates that a tine is neither positioned in the extended position nor in the retracted position but is separated from the tine bar and potentially contained in the stuffer chute or charge of crop material.

An aspect of the present invention also relates to an agricultural baler, in particular to a rectangular or a large square baler, comprising a baling chamber, a plunger reciprocally movable within the baling chamber and a stuffer assembly according to the present invention. The stuffer chute is connected to the baling chamber and the stuffer is configured to transfer the charge of crop material collected within the stuffer chute into the baling chamber.

The agricultural baler can therefore make full use of the advantages described with regard to the stuffer assembly. Accordingly, all features described in relation to the stuffer assembly are also applicable to the baler, and vice versa.

The agricultural baler further comprises a pick-up unit configured to pick up cut crop material from the field and to feed the crop material into the stuffer chute, where the crop material is collected and precompressed to form a charge of crop material. A feed opening connects the stuffer chute to the baling chamber and is preferably located in a bottom wall of the baling chamber. When the plunger is in a retracted position, the feed opening is cleared and the stuffer assembly can be tripped to transfer the charge of crop material into the baling chamber. In the baling chamber, the reciprocating plunger compresses multiple charges of crop material to form a bale.

According to an aspect of the present invention, a method for operating a stuffer assembly of an agricultural baler comprises the following steps:

Tripping a stuffer having a plurality of tines mounted on a tine bar to transfer a charge of crop material collected within a stuffer chute into a baling chamber of the agricultural baler;

Moving the stuffer along a stuffer trajectory to insert the plurality of tines into the stuffer chute and to push the charge of crop material into the baling chamber by means of the plurality of tines;

Retracting at least one tine of the plurality of tines from an extended position into a retracted position with respect to the tine bar in the event of a load applied on said at least one tine while moving the stuffer along the stuffer trajectory exceeds a predetermined threshold, wherein a crop engaging surface of the retracted tine remains in one level with the crop engaging surfaces of the other tines of the plurality of tines arranged in the extended position.

In this way, a tine bar and a stuffer drive mechanism of the stuffer assembly are protected from overload and damage by retracting the affected tine, thereby decreasing the load acting on said tine. For example, the increased load may be caused by a tine interfering with an obstacle, such as a stone comprised in the charge of crop material. The affected tine can then be moved into the retracted position to avoid further interaction with the obstacle. Hence, a load acting on the tine and thus on the tine bar will not increase further. At the same time, retracting the tine about a certain distance into the retracted position only reduces the depth of insertion of the tine into the stuffer chute but generally allows the tine to remain in an operational position enabling further engagement with the charge of crop material to be transferred into the baling chamber. Thus, the tine further engages with the charge of crop material even upon retraction, resulting in higher quality of the charge of crop material and therefore of the bale to be formed.

Preferably, the method is provided for operating the stuffer assembly according to the present invention. All features described in relation to the stuffer assembly do therefore apply to the method as well, and vice versa.

Moving the stuffer along the stuffer trajectory preferably comprises inserting the plurality of tines into the stuffer chute in a first section of the stuffer trajectory, moving the plurality of tines within the stuffer chute in a second section of the stuffer trajectory for transferring the charge of crop material, and moving the plurality of tines out of the stuffer chute and back into their original position in a third section of the stuffer trajectory. In the first and second sections of the stuffer trajectory the plurality of tines engages the crop material present within the stuffer chute resulting in a certain load being applied on the tines. Also, a tine of the plurality of tines may potentially hit an obstacle contained in the crop material, such as a stone or the like, causing an increased load acting on said tine.

In one embodiment, the method further comprises the step of completely separating the at least one retracted tine of the plurality of tines from the tine bar when the load acting on the at least one tine or on a connection of the at least one tine to the tine bar exceeds a predetermined first load while moving the stuffer along the stuffer trajectory. The predetermined threshold then corresponds to a second load acting on this tine or on a connection of this tine to the tine bar, wherein the first load is greater than or equal to the second load. Consequently, as the load acting on a tine increases and exceeds the second load, the affected tine is first retracted into the retracted position. Should the load acting on said tine increase further and exceed the first load, the affected tine is separated from the tine bar. A two-stage safety system can thereby be provided to reduce downtime of the baler as described above. The predetermined first and second loads can be adapted by choosing the first and second connecting means accordingly.

The step of completely separating the tine from the tine bar especially comprises the load acting on the tine causing the connection of the tine to the tine bar to fail. Hence, the tine may remain undamaged and only its connection to the tine bar needs to be re-established, e.g. by removing potential remainders of a previous connecting means and by inserting a new connecting means, such as a bolt.

The step of separating the tine from the tine bar may alternatively comprise the load acting on the tine causing the tine to break. In this case, a new tine needs to be mounted on the tine bar after removing the remainder of the broken tine.

An adaption of the stuffer assembly to the crop material to be collected can further be realized. Therefore, before tripping the stuffer, the method preferably comprises the additional steps of:

Selecting a type of tines depending on a characteristic of the crop material to be collected;
Mounting a plurality of tines of the selected type to the tine bar.

Suitable types of tines and characteristics of the crop material are already described with regard to the stuffer assembly above.

In a preferred embodiment, the method further comprises the steps of:

Detecting a position of each tine of the plurality of tines by means of a plurality of sensors;
Providing an output signal of the plurality of sensors to an operator of the agricultural baler at least in the event of retraction of the at least one tine into the retracted position.

As regards the plurality of sensors and their function it is referred to the description of the plurality of sensors above.

Accordingly, the method may further comprise any of the following steps or a combination thereof:

Alerting the operator in response to the output signal indicating retraction of at least one tine into the retracted position;
Providing the output signal to a baler control unit or towing vehicle control unit and automatically adapting the speed of the baler or towing vehicle in response to the output signal;
Providing the output signal to a baler control unit and stopping the pick-up unit in response to the output signal.

BRIEF DESCRIPTION OF THE DRAWINGS

Further features and advantages of the present invention will now be described with reference to the accompanying drawings.

DETAILED DESCRIPTION OF THE INVENTION

Figure 1:
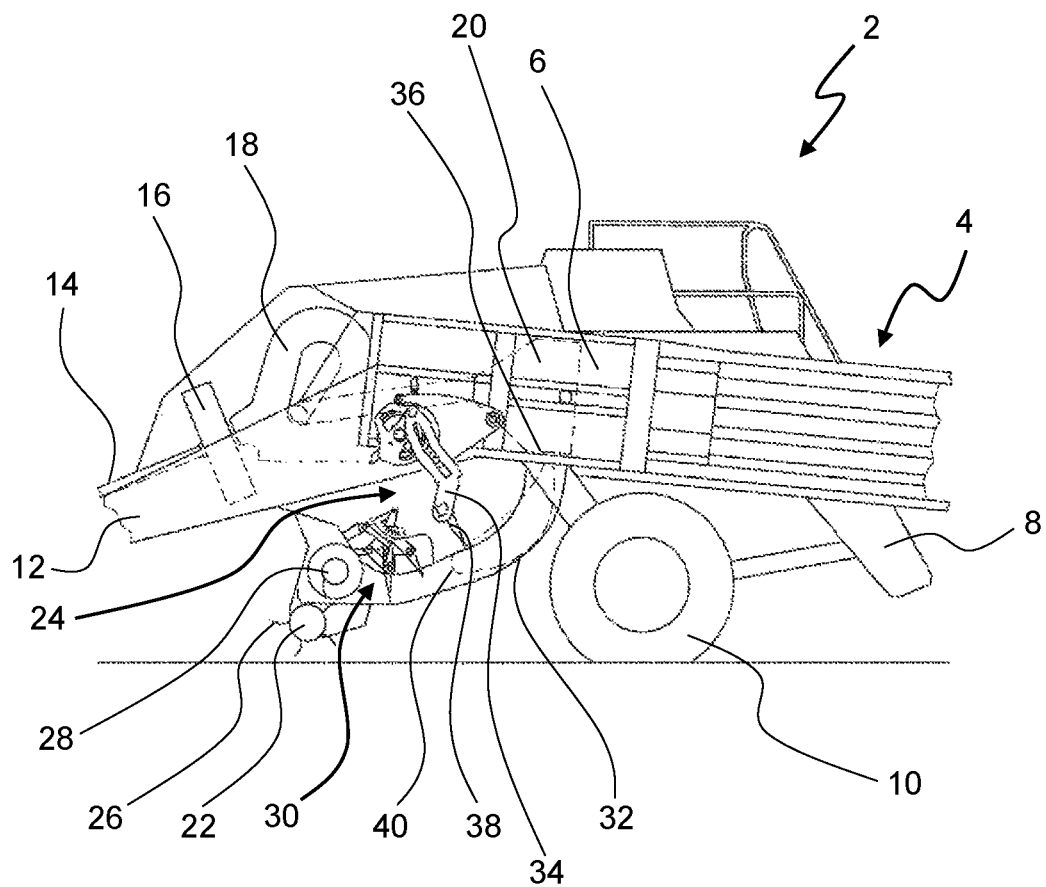
FIG. 1 is a schematic side view of an agricultural baler.

In FIG. 1 an agricultural baler 2 is shown in a side view. The baler 2 comprises a bale case 4 extending in a fore-and-aft direction of the baler 2 and defining a baling chamber 6, in which a bale is to be formed. The bale case 4 is supported by a frame 8 of the baler 2, which in turn is carried by ground-engaging wheels 10. A forwardly extending tongue 12 is provided on the baler 2 to hitch the baler 2 to a towing vehicle (not shown), such as a tractor, for advancing the baler 2 across a field. Further, the baler 2 comprises a forwardly extending baler drive shaft 14 to be connected to a power take-off (PTO) of the towing vehicle in order to transfer power from the towing vehicle to the baler 2. In the baler 2, a flywheel 16 and a gearbox 18 are connected to the baler drive shaft 14 to transmit power to a plunger 20 of the baler 2. The plunger 20 is configured to reciprocally move in the fore-and-aft direction of the baler 2 within the baling chamber 6 for periodically compacting crop material fed into the baling chamber 6.

The baler 2 further comprises a pick-up unit 22 for picking up windrowed crop material from the field and delivering the crop material rearward towards a stuffer assembly 24 of the baler 2. The pick-up unit 22 may have a plurality of lifting tines 26 sweeping up crop material from the field. Augers 28 and/or a cut unit may be provided rearward of the pick-up unit 22 in a known manner. Moreover, a packer unit 30 may be positioned behind the pick-up unit 22 for feeding the crop material into a stuffer chute 32 of the stuffer assembly 24. The packer unit 30 may be configured to collect and pre-compress the crop material within the stuffer chute 32.

Besides the stuffer chute 32, the stuffer assembly 24 comprises a stuffer 34 configured to transfer the charge of crop material collected within the stuffer chute 32 into the baling chamber 6. The stuffer chute 32 is thus connected to the baling chamber 6 by a feed opening 36 provided in a bottom wall of the baling chamber 6. The stuffer 34 comprises a plurality of tines 38 movable along a stuffer trajectory 40 indicated by dotted lines in FIG. 1. In the embodiment shown, the stuffer 34 only transfers the charge of crop material into the baling chamber 6 and the stuffer trajectory 40 thus only includes one long stroke of the plurality of tines 38 within the stuffer chute 32. However, in order to eliminate the packer unit 30, the stuffer 34 may also be operated to execute smaller strokes for collecting and pre-compressing the crop material within the stuffer chute 32 followed by a long stroke for transferring the charge of crop material into the baling chamber 6.

Figure 2:
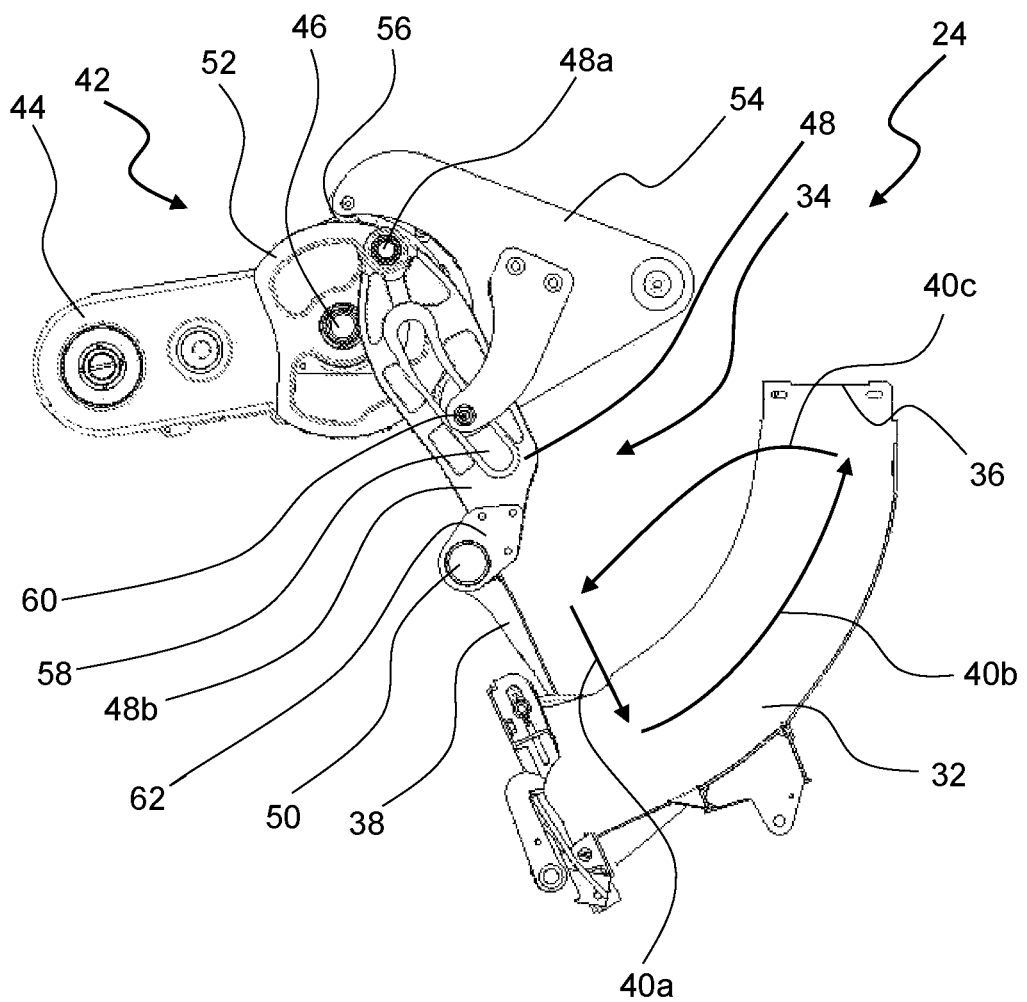
FIG. 2 is a schematic side view of a stuffer assembly of the baler according to FIG. 1.

The stuffer assembly 24 is shown in FIG. 2 in greater detail. In addition to the stuffer chute 32 and the stuffer 34, the stuffer assembly 24 comprises a stuffer drive mechanism 42 having, for example, a stuffer gearbox 44 connected to a stuffer drive shaft 46 driving the stuffer 34. The stuffer 34 comprises a stuffer arm 48 having a first end 48*a* coupled to the stuffer drive mechanism 42 and a second end 48*b* opposite the first end 48*a*. A tine bar 50 is mounted on the second end 48*b* of the stuffer arm 48.

The stuffer trajectory 40 has a first section 40*a* along which the plurality of tines 38 is inserted into the stuffer chute 32, a second section 40*b* along which the tines are moved within the stuffer chute 32 for transferring the crop material, and a third section 40*c* along which the tines are moved out of the stuffer chute 32 and back to their original position shown in FIG. 2. In the first and second section 40*a, b* of the stuffer trajectory 40 the plurality of tines 38 engages the crop material present within the stuffer chute 32 resulting in a certain load being applied on the tines 38. Also, a tine 38 of the plurality of tines 38 may potentially hit an obstacle contained in the crop material, such as a stone or the like, causing an increased load acting on said tine 38.

In order to move the plurality of tines 38 along the stuffer trajectory 40, the first end 48*a* of the stuffer arm 48 is pivotally coupled to a cam 52 provided on the stuffer drive shaft 46 and rotating with the stuffer drive shaft 46. In addition, a support member 54 may be provided, wherein the support member 54 comprises a cam follower 56 contacting a cam surface of the cam 52 and a pin 60 slidably received within a longitudinal slot 58 in the stuffer arm 48.

Figure 3:
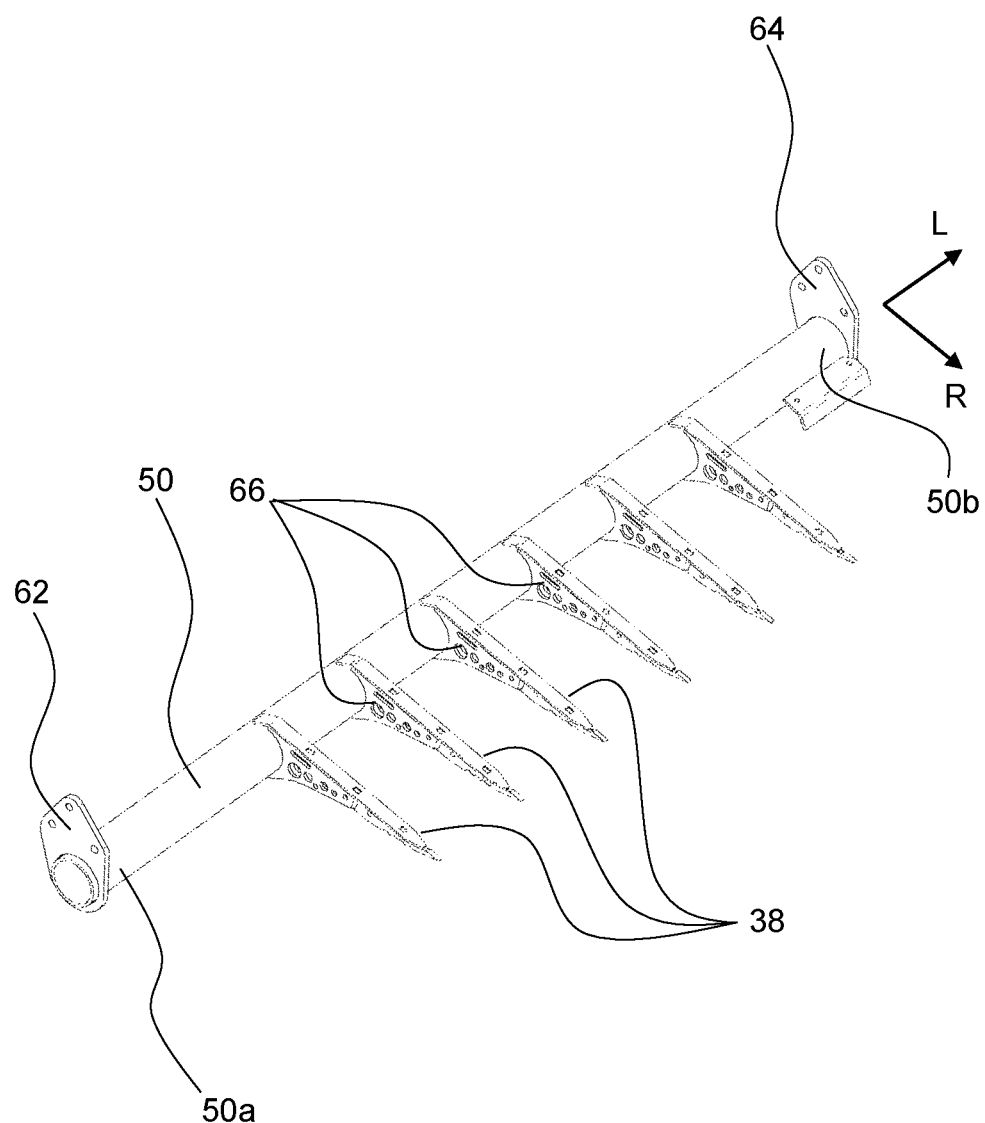
FIG. 3 is a perspective view of a tine bar of the stuffer assembly according to FIG. 2.

In FIG. 3, the tine bar 50 is shown in a perspective view. A first flange 62 is provided on a first end 50*a* of the tine bar 50 and a second flange 64 is provided on an opposite second end 50*b* of the tine bar 50. The first and second flange 62, 64 connect the tine bar 50 to the stuffer arm 48, respectively, as shown in FIG. 2 for the first flange 62. The plurality of tines 38 is arranged next to each other in a longitudinal direction L of the tine bar 50. Further, the plurality of tines substantially extends parallel to a radial direction R of the tine bar 50.

Beneficial features of the plurality of tines 38 will now be described with reference to FIGS. 4 to 9 on the basis of one tine 38 of the plurality of tines 38. Obviously, these features apply to each of the plurality of tines 38.

The plurality of tines 38 is preferably detachably mounted on the tine bar 50. In the preferred embodiment shown in the figures, each tine 38 is individually connected to the tine bar 50 by means of a bracket 66 also shown in FIG. 3. The bracket 66 may be fixedly attached to the tine bar 50, e.g. by welding, but can alternatively be detachably mounted on the tine bar 50 as well. Preferably, the bracket 66 comprises a first mounting plate 68 and a second mounting plate 70 arranged next to each other in the longitudinal direction L of the tine bar 50 and extending from the tine bar 50 parallel to the radial direction R of the tine bar 50. The tine 38 is partially received between the first mounting plate 68 and the second mounting plate 70. However, the bracket 66 may have any suitable design for connecting the tine 38 to the tine bar 50. For example, the bracket 66 may comprise only one mounting plate or the mounting plates 68, 70 may be integrally formed as a single part having a recess to receive the tine 38.

Figure 6:
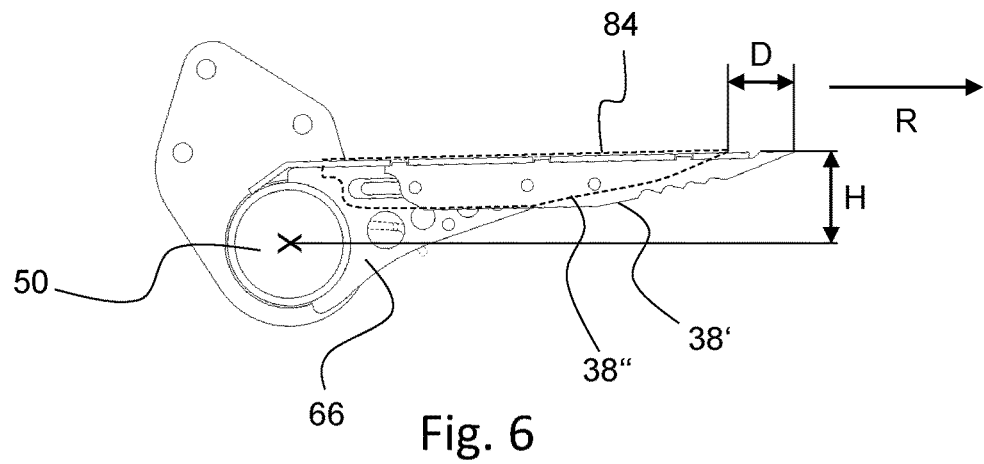
FIG. 6 is a cross-sectional view of one embodiment of the tine bar according to FIG. 3 showing a tine in an extended position and in a retracted position.

Each tine 38 is slidably connected to the tine bar 50 such that the tines 38 are linearly movable between an extended position and a retracted position with respect to the tine bar 50 in a direction parallel to the radial direction R of the tine bar 50. The extended and retracted positions are shown in FIG. 6, in which a tine placed in the extended position is denoted by reference number 38' and a tine placed in the retracted position is indicated in dotted lines and denoted by reference number 38".

Figure 4:
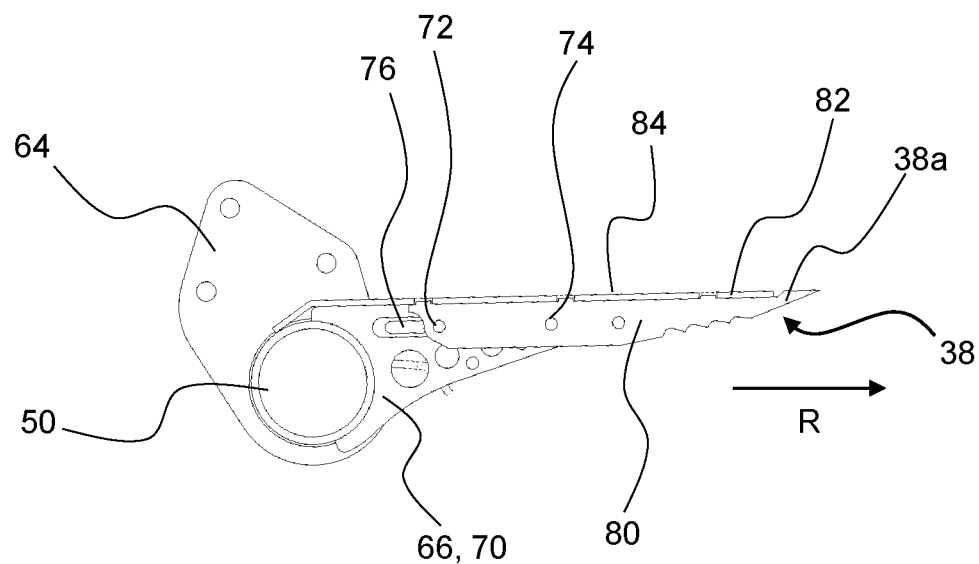
FIG. 4 is a cross-sectional view of the tine bar according to FIG. 3.
Figure 5:
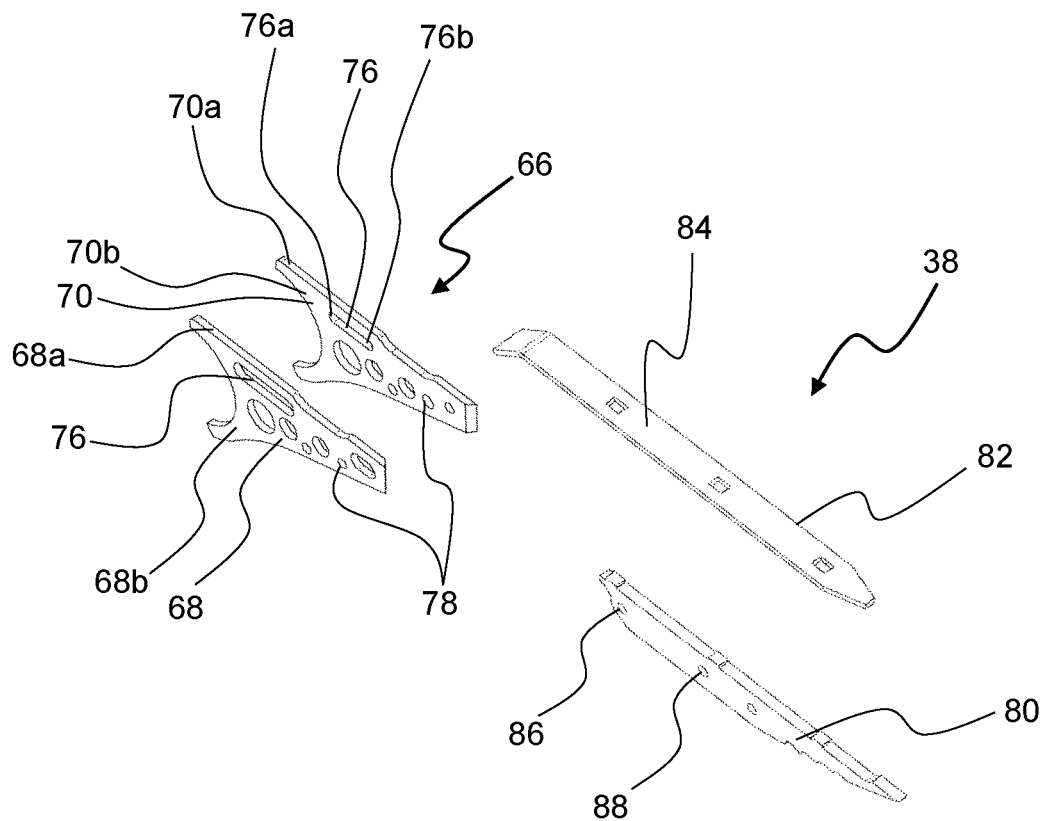
FIG. 5 is an exploded view of a tine and a bracket of the tine bar according to FIG. 3.

Referring to FIGS. 4 and 5, each tine 38 may be connected to the corresponding bracket 66 at least by a first connecting means 72 and, preferably, by a second connecting means 74. In an exemplary embodiment, the first connecting means 72 movably connects the tine 38 to the bracket 66, such that the tine 38 is movable between the extended position and the retracted position. The second connecting means 74 positions and fastens the tine 38 in the extended position.

The first connecting means 72 may be configured to fail or deform at a predetermined first load and the second connecting means 74 may be configured to fail or deform at a predetermined second load, which is equal to or less than the predetermined first load.

The bracket 66 and, if applicable, at least one of the first and second mounting plates 68, 70 of the bracket 66 may comprise a guide means 76 slidably receiving the first connecting means 72. As shown in FIGS. 4 and 5, each of the first and second mounting plates 68, 70 comprises a guide means 76 in the form of an elongated hole receiving the first connecting means 72, such as a bolt. The guide means 76 extends substantially perpendicular to the longitudinal direction L of the tine bar 50 to allow linear movement of the tine 38 to and fro the tine bar 50 parallel the radial direction R. The length of the guide means 76 preferably defines a distance D about which the tine 38 is movable between the extended position and the retracted position, the distance D also being indicated in FIG. 6. A first end 76*a* of the guide means 76 close to the tine bar 50 defines the retracted position of the tine 38 and a second end 76*b* of the guide means 76 opposite the first end 76*a* defines the extended position of the tine 38.

In order to secure the tine 38 in the extended position, the second connecting means 74 may be formed as a bolt received in a corresponding hole of the bracket 66. For example, the first and second mounting plates 68, 70 may each comprise a hole 78 receiving the second connecting means 74 thereby fastening the tine 38 in the extended position. That is, the second connecting means 74 prevents movement of the tine 38 with respect to the tine bar 50.

Figure 7:
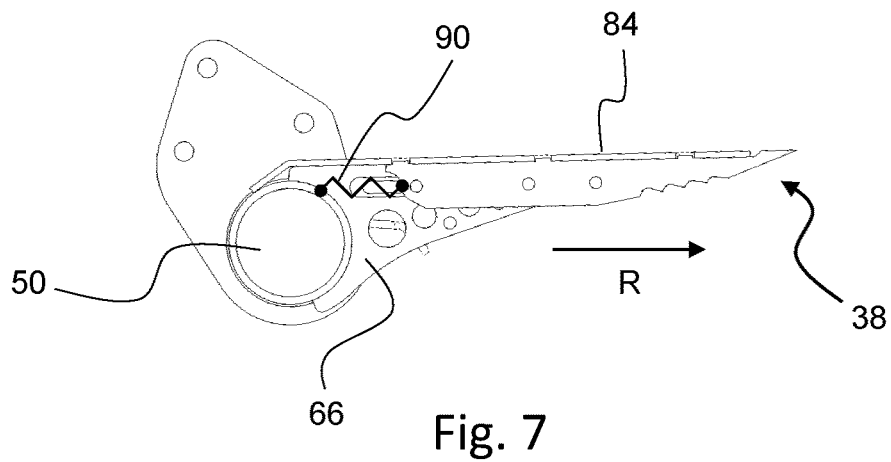
FIG. 7 is a cross-sectional view of one embodiment of the tine bar according to FIG. 3 comprising a resilient member.

Alternatively or in addition, the second connecting means 74 may comprise a resilient member 90, such as a spring, as shown in FIG. 7. The resilient member 90 biases the tine 38 into the extended position but allows movement of the tine 38 into the retracted position in response to an increased load acting on the tine 38. A first end of the resilient member 90 may be fixedly connected to the tine bar 50 and a second end of the resilient member 90 may be fixedly connected to the tine 38. A force exerted by the resilient member 90 is preferably directed in a direction parallel to the radial direction R and defines the bias of the tine into the extended position.

The tine 38 may further comprise a tine support 80 connecting the tine 38 to the bracket 66 and a tine body 82 having a crop engaging surface 84. The tine support 80 and the tine body 82 may be integrally or separately formed. At least a portion of the tine 38 comprising a tip 38*a* of the tine 38 should be movable with respect to the tine bar 50.

The tine support 80 can be a plate-like member comprising mounting holes 86 and 88 receiving the first and second connecting means 72, 74, respectively. The tine body 82 may be a plate-like member having the crop engaging surface 84. The tine support 80 and the tine body 82 can be connected to form a T-shaped cross-section, wherein the tine support 80 is connected to a surface of the tine body 82 opposite the crop engaging surface 84. The size and shape of the tine body 82 and, thus, of the crop engaging surface 84 can be adapted depending on a characteristic of the crop material to be collected.

A top surface 68a, 70a of the first and second mounting plates 68, 70 facing the tine body 82 may slidably support the tine body 82 and thus the tine 38. Hence, top surfaces 68a and 70a can also be considered as guide means. In addition, inner surfaces 68b and 70b of the first and second mounting plates 68, 70 facing the tine support 80 may slidably guide the tine support 80 and can also be considered as guide means.

Figure 8:
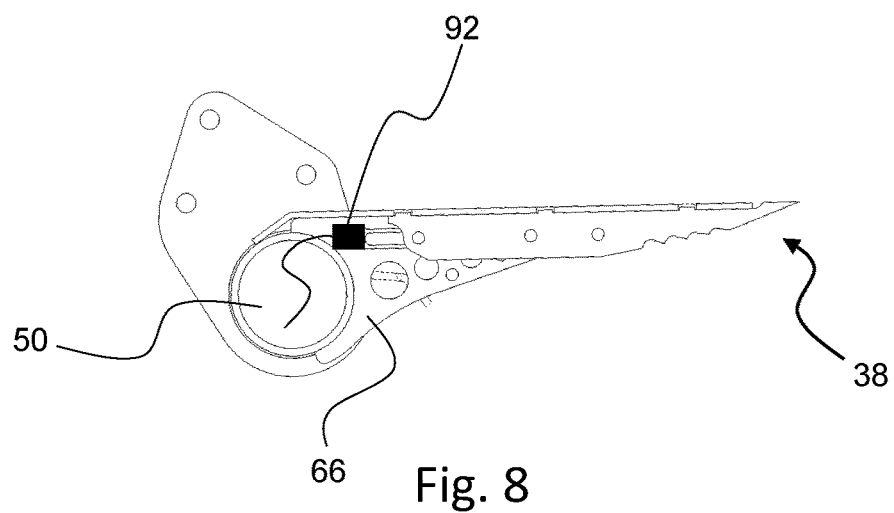
FIG. 8 is a cross-sectional view of one embodiment of the tine bar according to FIG. 3 comprising a sensor.

As can be seen in FIG. 8, a sensor 92 of a plurality of sensors 92 may be provided to detect the position of the tine 38. For example, the sensor 92 may be a proximity sensor or a contact switch configured to detect whether the tine 38 is arranged in the retracted position or not and to provide a corresponding output signal.

Referring to FIGS. 2 to 6, a function of the stuffer assembly 24 and a method for operating the stuffer assembly 24 will now be described. While collecting crop material in the stuffer chute 32, the stuffer 34 is arranged in its original position as shown in FIG. 2. When the stuffer chute 32 is filled with crop material to a desired degree, the stuffer 34 is tripped to transfer a charge of crop material collected within the stuffer chute 32 into the baling chamber 6 in a known manner. Therefore, the stuffer 34 is first moved along the first section 40a of the stuffer trajectory 40 to insert the plurality of tines 38 into the stuffer chute 32. Then, the charge of crop material is pushed into the baling chamber 6 by means of the plurality of tines 38, which are moved along the second section 40b of the stuffer trajectory 40. If a tine 38 of the plurality of tines 38 hits a stone or other obstacle comprised within the charge of crop material, a load acting on the tine 38 suddenly increases. In this event, it is desired to protect the stuffer drive mechanism 42 and the tine bar 50 from overload and damage caused by the load applied to the tine 38.

Hence, the tine 38, on which the increased load is applied, is retracted from the extended position into the retracted position, wherein the crop engaging surface 84 of the retracted tine 38 remains on a first level H with crop engaging surfaces 84 of the other tines 38, which are still arranged in the extended position, as indicated in FIG. 6. That is, the crop engaging surfaces 84 of the plurality of tines 38 are always arranged on the first level H with respect to the tine bar 50 and, in particular, a crop engaging surface 84 of the tine 38 moved into the retracted position is moved in and arranged on the first level H as well. Thus, the retracted tine 38 remains operational and can still engage with the charge of crop material to be transferred into the baling chamber 6.

In the preferred embodiment shown in the figures and as a first stage of the safety mechanism, the tine 38 is retracted from the extended position into the retracted position once the load acting on said tine 38 equals or exceeds the predetermined second load while moving the stuffer 34 along the stuffer trajectory 40. The second load is equal to or less than the first load and the tine 38 will therefore be retracted from the extended position before separating the tine 38 from the tine bar 50 entirely. By doing so, the tine 38 may be moved out of interference with an obstacle thereby decreasing the load acting on the tine 38. If this sufficiently reduces the load acting on the tine 38 during further operation, completely separating the tine 38 from the tine bar 50 may not be necessary to protect the tine bar 50 and the stuffer drive mechanism 42. The connection of the tine 38 to the tine bar 50 allows further operation of the stuffer assembly 24 upon moving the tine 38 into the retracted position, such that no downtime of the baler 2 occurs. Alternatively, the tine 38 only needs to be positioned in the extended position again. In either case, a plurality of sensors 92 detecting the position of the tine 38 may be provided to indicate the condition of the plurality of tines 38 to an operator of the baler.

For example, the second connecting means 74 formed by a (shear) bolt fails and breaks when the load applied to the second connecting means 74 exceeds the predetermined second load. Alternatively, the second connecting means 74 formed by a resilient member 90 deforms. This allows the first connecting means 72 and, therefore, the tine 38 to move along the guide means 76 from the extended position into the retracted position as shown in FIG. 6.

If, however, the load acting on the retracted tine 38 and on the connection of the tine 38 to the tine bar 50 further increases and eventually equals or exceeds the predetermined first load, the tine 38 may be completely separated from the tine bar 50. For example, the first connecting means 72 is formed by a (shear) bolt which fails as the predetermined first load is exceeded, thereby completely separating the tine 38 from the tine bar 50. The stuffer drive mechanism 42 and the tine bar 50 are thereby decoupled from the loaded tine 38, thus avoiding the increased load to be transferred to the tine bar 50 and stuffer drive mechanism 42.

If only the connection of the tine 38 to the tine bar 50 fails and the tine 38 itself remains undamaged, the separated tine 38 can be detachably mounted on the tine bar 50 again. Otherwise, a new tine 38 can be detachably mounted on the tine bar 50 to replace the separated tine 38. In either case, the stuffer assembly 24 can be quickly and easily brought back into an operational condition, such that downtime of the baler 2 is minimized.

Hence, embodiments of the present invention provide a reliable safety mechanism to protect the tine bar 50 and stuffer drive mechanism 42 from overload and damage and reduce downtime of the baler 2 as well as the efforts necessary to bring the stuffer assembly back into an operational condition. At the same time, an adverse effect on the quality of the bale is minimized.

The invention claimed is:

1. A stuffer assembly for an agricultural baler comprising:
 a stuffer chute for collecting and pre-compressing a charge of crop material; and
 a stuffer configured to transfer the charge of crop material collected within the stuffer chute into a baling chamber of the agricultural baler, wherein the baling chamber is positioned above the stuffer chute,
 wherein the stuffer comprises a stuffer arm having a tine bar mounted to one end of the stuffer arm, wherein the tine bar comprises a plurality of tines, and
 wherein each tine of the plurality of tines is slidably connected to the tine bar such that each tine of the plurality of tines is linearly movable with respect to the tine bar between an extended position and a retracted position in a direction parallel to a radial direction of the tine bar.

2. The stuffer assembly according to claim 1, wherein, in the extended position, crop engaging surfaces of the plurality of tines are arranged on a first level, wherein a crop engaging surface of a tine of the plurality of tines, which is positioned in the retracted position, is also arranged on the first level.

3. The stuffer assembly according to claim 1, wherein a plurality of brackets is mounted on the tine bar and at least one tine of the plurality of tines is slidably connected to each bracket of the plurality of brackets by a first connector.

4. The stuffer assembly according to claim 3, wherein each tine of the plurality of tines is further connected to the corresponding bracket by a second connector securing the tine in the extended position.

5. The stuffer assembly according to claim 4, wherein the first connector is configured to fail or deform at a predetermined first load, and the second connector is configured to fail or deform at a predetermined second load, wherein the first load is greater than or equal to the second load.

6. The stuffer assembly according to claim 4, wherein the first connector comprises a bolt slidably received in the bracket or the tine, and the second connector comprises a bolt or a resilient member.

7. The stuffer assembly according to claim 3, wherein each bracket of the plurality of brackets comprises a first mounting plate and a second mounting plate arranged next to each other in a longitudinal direction of the tine bar and extending from the tine bar in the radial direction thereof, wherein each tine of the plurality of tines is partially received between the first mounting plate and the second mounting plate of the corresponding bracket.

8. The stuffer assembly according to claim 7, wherein at least one of the first mounting plate and the second mounting plate comprises a guide, the guide being configured to slidably receive the first connector or to support a sliding portion of the tine.

9. The stuffer assembly according to claim 1, wherein the stuffer assembly further comprises a plurality of sensors configured to detect a position of each tine of the plurality of tines.

10. The stuffer assembly according to claim 1, wherein a distance about which each tine of the plurality of tines is movable between the extended position and the retracted position is between 5 mm and 250 mm.

11. The stuffer assembly according to claim 1, wherein a distance about which each tine of the plurality of tines is movable between the extended position and the retracted position is between 10 mm and 150 mm.

12. The stuffer assembly according to claim 1, wherein a distance about which each tine of the plurality of tines is movable between the extended position and the retracted position is between 20 mm and 60 mm.

13. An agricultural baler comprising:
a baling chamber,
a plunger reciprocally movable within the baling chamber; and
a stuffer assembly comprising a stuffer chute for collecting and pre-compressing a charge of crop material, and a stuffer configured to transfer the charge of crop material collected within the stuffer chute into the baling chamber,
wherein the stuffer comprises a stuffer arm having a tine bar mounted to one end of the stuffer arm, wherein the tine bar comprises a plurality of tines,
wherein each tine of the plurality of tines is slidably connected to the tine bar such that each tine of the plurality of tines is linearly movable with respect to the tine bar between an extended position and a retracted position in a direction parallel to a radial direction of the tine bar, and
wherein the stuffer chute is positioned below the baling chamber.

14. A method for operating a stuffer assembly of an agricultural baler, the method comprising the steps of:
tripping a stuffer having a plurality of tines mounted on a tine bar to transfer a charge of crop material collected within a stuffer chute into a baling chamber of the agricultural baler;
moving the stuffer along a stuffer trajectory to insert the plurality of tines into the stuffer chute and to push the charge of crop material into the baling chamber by means of the plurality of tines;
retracting at least one tine of the plurality of tines from an extended position into a retracted position with respect to the tine bar in the event of a load applied on said at least one tine while moving the stuffer along the stuffer trajectory exceeds a predetermined threshold,
wherein a crop engaging surface of the retracted tine remains in one level with crop engaging surfaces of the other tines of the plurality of tines arranged in the extended position, and wherein each tine of the plurality of tines is slidably connected to the tine bar such that each tine of the plurality of tines is linearly movable with respect to the tine bar between the extended position and the retracted position in a direction parallel to a radial direction of the tine bar.

15. The method according to claim 14, wherein the method further comprises the step of:
completely separating the at least one retracted tine of the plurality of tines from the tine bar when a load acting on the at least one tine or on a connection of the at least one tine to the tine bar exceeds a predetermined first load while moving the stuffer along the stuffer trajectory,
wherein the predetermined threshold corresponds to a second load acting on the at least one tine or on a connection of the at least one tine to the tine bar, wherein the first load is greater than or equal to the second load.

16. The method according to claim 14, wherein the method further comprises the steps of:
detecting a position of each tine of the plurality of tines by means of a plurality of sensors; and
providing an output signal of the plurality of sensors to an operator of the agricultural baler at least in the event of retraction of the at least one tine into the retracted position.

17. The method according to claim 14, wherein, before tripping the stuffer, the method further comprises the steps of:
selecting a type of tines depending on a characteristic of the crop material to be collected; and
mounting a plurality of tines of the selected type to the tine bar.

* * * * *